United States Patent [19]
Blackmon et al.

[11] Patent Number: 4,983,718
[45] Date of Patent: Jan. 8, 1991

[54] COLOR MINIMIZATION DURING MELT PREPARATION OF POLYAMIDES WITH HYPOPHOSPHORUS ACID

[75] Inventors: Kenneth P. Blackmon, Houston, Tex.; Donald C. Clagett; Sheldon J. Shafer, both of Pittsfield, Mass.

[73] Assignee: General Electric Company, Pittsfield, Mass.

[21] Appl. No.: 364,360

[22] Filed: Jun. 9, 1989

[51] Int. Cl.$^5$ ............................................. C08G 69/28
[52] U.S. Cl. .................................. 528/336; 524/606; 528/347
[58] Field of Search ................................ 528/336, 347

[56] References Cited

U.S. PATENT DOCUMENTS

| | | | |
|---|---|---|---|
| 3,723,396 | 3/1973 | Jones et al. | 528/336 |
| 4,163,101 | 7/1979 | Schade et al. | 528/347 |
| 4,495,328 | 1/1985 | Poppe et al. | 524/606 |
| 4,567,249 | 1/1986 | Fox et al. | 528/347 |

Primary Examiner—Harold D. Anderson
Attorney, Agent, or Firm—Spencer D. Conard; William F. Mufatti

[57] ABSTRACT

A process for minimizing the formation of color during preparation of polyamides by interchange of diesters of dicarboxylic acids with diamines in the presence of hypophosphorous acid.

17 Claims, No Drawings

COLOR MINIMIZATION DURING MELT PREPARATION OF POLYAMIDES WITH HYPOPHOSPHORUS ACID

BACKGROUND OF THE INVENTION

1. Field of the Invention

The present invention relates to a process for minimizing the formation of color during preparation of polyamides by ester-amine interchange and, more particularly, relates to the preparation of polyamides by ester-amine interchange in the presence of hypophosphorous acid.

2. Description of Related Art

Melt preparation of polyamides by amine ester interchange is known in the art, see Fox, et. al., U.S. Pat. No. 4,567,249, which is incorporated herein by reference. Although the aforementioned melt process has numerous advantages over prior salt process, the polyamides prepared by the melt process have often produced yellow-golden colored amorphous polyamides. This coloration may be at least partially attributable to oxidation of phenolic byproducts produced during the melt process.

It is an object of the present invention to provide an ester-amine interchange melt process which will produce amorphous polyamides having reduced coloration.

SUMMARY OF THE INVENTION

According to the present invention, there is provided a process for the preparation of a melt processable polyamide by ester-amine interchange. The process involves heating a mixture of at least one diaryl ester of a dicarboxylic acid having at least 6 carbon atoms, at least one di-primary amine having at least 4 carbon atoms and an amount of hypophosphorous acid, at a temperature of at least 180° C. Melt processed polyamides made in the presence of hypophosphorous acid exhibit reduced color formation when compared to similar melt processed polyamides made in the absence of hypophosphorous acid.

DETAILED DESCRIPTION OF THE INVENTION

The process of the present invention involves the melt polymerization of polyamides in the presence of hypophosphorous acid. The process involves heating, in the substantial absence of added solvents, a mixture of at least one diaryl ester of a dicarboxylic acid having at least 6 carbon atoms and at least one di-primary amine having at least 4 carbon atoms, at a temperature above 180° C. and in the presence of an amount of hypophosphorous acid. The hypophosphorous acid may either be added into the initial unreacted mixture or may be added after the reaction has been initiated or may be added to the final polyamide phenol solution produced to reduce coloration thereof.

Illustratively, useful diaryl esters of dicarboxylic acids suitable for use in the process of the present invention are diphenolic esters derived from phenolic compounds, e.g., a monohydric phenol, including phenol itself, and alkyl- or halo-substituted phenols, such as o-, m-, and p-cresols, and o- and p-chlorophenol, and the like, and a dicarboxylic acid, e.g., one having at least 5 carbon atoms, such as the aliphatic diacids like glutaric acid, adipic acid, azeleic acid, 1, 12-dodecane dicarboxylic acid, and others, of up to about 30 inclusive carbon atoms and the aromatic diacids, such as phthalic, isophthalic and terephthalic acid. The acids must be higher boiling than phenol to facilitate synthesis. Generally not suitable, because they do not produce melt-processable polyamides, are combinations of diphenol esters of aromatic dicarboxylic acids with aromatic diamines. A preferred family of diesters are diphenolic esters of terephthalic acid, isophthalic acid, and mixtures thereof.

As examples of di-primary amines, particularly useful in the process are those of the general formula $H_2N$—$R$—$NH_2$ wherein R is divalent straight chain, branched or cyclic alkylene or arylene of such groups optionally interrupted with carbonyl, amino, sulfur-containing groups, and the like, with a total carbon content of the order of 4 to 30 carbon atoms. Illustrative examples are 1,4-tetramethylene diamine, 1,6-hexamethylene diamine, 1,12-diaminododecane, bis(4-aminocyclo-hexyl)methane, meta xylylenediamine, 2 methyl pentamethylene diamin, 1,3cyclohexane bis(methylamine), mixtures thereof, and the like. Generally unsuitable are di-primary aromatic diamines, such as m-phenylene diamine and p-phenylene diamine, which have a general tendency to produce polyamides which are so high melting as to be not melt-processable, especially when reacted with isophthalates and terephthalates.

In general, the process is carried out by charging the mixture into a reaction vessel and heating the reactants until they are melted. The ester-amine interchange reaction occurs smoothly and rapidly at temperatures in the range from about 135° C., to about 350° C., and pressures from atmospheric down to about 15 torr. The reactor should permit removal of the byproduct phenolic compound as it is produced. Temperatures in the above mentioned range readily permit removal by distillation of the usual byproducts, e.g., phenol, o-cresol, p-chlorophenol, and the like.

An alternate polymerization and polymer recovery process consists of heating the mixture until the appropriate interchange has occurred without removal of the phenolic by-products. Polymer recovery may be effected by means of anti-solvent addition to precipitate the polymer.

The hypophosphorous acid (HPA), $H_3PO_2$, is effective to reduce the coloration of the polyamide which results during the melt process. The hypophosphorous acid may be added into the initial ester-amine mixture or may be added after initiation of the reaction or may be added to the resulting polyamide-phenol reaction product upon completion of the reaction. The hypophosphorous acid when added in either of the above situations will reduce the final coloration of the polyamide. In each of the above situations following the addition of hypophosphorous acid to the system, the temperature of the system must be raised to at least 180° C. and preferably 200° C. The phenol byproduct may be removed by vacuum either during the reaction or upon completion thereof.

Preferably, the level of hypophosphorous acid employed is at least 0.10 wt % based on the total weight of reactants, more preferably between 0.10 wt % and 0.50 wt % thereof, and most preferably 0.10 wt % and 0.20 wt % thereof.

The polymers are recovered in conventional ways and they may be molded in any desired shape and are useful as structural and engineering materials to replace metal parts, in electrical appliances, as lenses, safety shields, instrument windows and in food wrappings. They are used in many other ways known for such polymers.

The invention is further described in the examples which follow. These examples are illustrative embodiments of the invention, and are not to be construed in limitation thereof. Polymeric products were thermally characterized by glass transition temperature (Tg) and crystal melting point (Tm) as determined with a Perkin-Elmer DSC-2 instrument at a scanning rate of 20° C./min. The relative degree of polymerization was estimated by determining intrinsic viscosities in a 40:60 tetrachloroethane:phenol mixture at 30° C. and reported as deciliters/gram.

The following examples illustrate the effectiveness of hypophosphorous acid in reducing color formation during ester-amine interchange in melt preparation of amorphous polyamides. The following examples also illustrate the ineffectiveness of other related compounds in the reduction of color formation in melt polymerization of amorphous polyamides. Unless indicated otherwise, the processes set forth in the following examples involved the preparation of nylon 6,I by melt polymerization by ester-amine interchange of substantially equal mole amounts of hexamethylenediamine and diphenylisophthalate. The weight percent of additive employed is calculated by weight of additive (i.e. weight of HPA) divided by the combined weight of the reactants (i.e. the combined weight of the diamines and the diaryl ester of the dicarboxylic acid to be reacted to form the polyamide and the phenolic byproducts).

Intrinsic viscosities in the following examples are determined in 40:60 tetracholorethane:phenol mixture at 30° C. and are listed as deciliters/grams.

EXAMPLE 1

About 0.5 weight percent of the following additives were added to respective charges of hexamethylene diamine and diphenyl isophthalate which were heated to a reaction temperature of between 180° C. and 200° C. for a period of 1.5 hr. to form nylon 6,I by melt polymerization involving ester-amine interchange. The nylon 6,I produced generated phenol as a byproduct and had intrinsic viscosities of between 0.6–0.9 dl/g. The ability of each additive to substantially reduce color formation was determined visually relative to a control reaction with no additive present. The additives as well as their ability to reduce color formation are shown below in Table I. The acids employed as additives were diluted in water, for example the formic acid additive was 90% formic acid and 10% water.

TABLE 1

| Additive | Formula | Color Reduction |
|---|---|---|
| Disodium Phosphate | $Na_2HPO_4$ | No |
| Sodium Hypophosphite | $NaH_2PO_2$ | No |
| Hypophosphorous Acid (50%) | $H_3PO_2$ | Yes |
| Formic Acid (90%) | HCOOH | No |
| Sodium Formate | HCCONa | No |
| Sodium Borohydride | $NaBH_4$ | No |
| DF1040 Silicone Fluid | — | No |
| Phosphoric Acid (85%) | $H_3PO_4$ | No |
| Phosphorous Acid (70%) | $H_3PO_3$ | Slight |

As can be seen from Table I, only the hypophosphorous acid substantially reduced color formation. Phosphorous acid showed a slight tendency to reduce color formation. Both hypophosphorous acid and phosphorous acid decompose with heat to yield phosphoric acid and phosphine thus the actual reducing agent may be phosphine. Phosphine however is spontaneously flammable and toxic and therefore was not practical as a direct additive for the process.

EXAMPLE 2

Effect of Hypophosphorous Acid (HPA) Concentration

In an effort to optimize the HPA concentration which affords significant color reduction, a study was conducted to monitor nylon-phenol solution color and IV as a function of added HPA. It is known that hypophosphorous acid decomposes at 130° C. to phosphoric acid and phosphine. The reactions were conducted at 180° C. for 2.5 hr; the results are shown below (Table 2):

TABLE 2

| Sample | Weight % HPA | IV,dl/g |
|---|---|---|
| Control | 0 | 1.20 |
| 1 | 0.02 | 1.10 |
| 2 | 0.10 | 0.78 |
| 3 | 0.20 | 0.62 |
| 4 | 0.50 | 0.56 |
| 5 | 1.00 | 0.39 |

From Table 2 it can be seen that as the weight % HPA increased, the IV decreased. Since the HPA was introduced as a 50% solution in water, progressively more and more water was being added to the system with increasing HPA concentration. It has since been shown that relatively large amounts of water were at least in part responsible for the reduced IV of the resulting resin. Color formation was reduced as the weight percent of HPA employed was increased. Color reduction became visually noticeable at levels of .10 wt % HPA or greater.

EXAMPLE 3

Effect of Reaction Time on HPA Effectiveness

The effect of reaction time at 180° C. was studied in an effort to establish the relative importance of this experimental parameter on the effectiveness of HPA as a color reducing agent. The results are shown below (Table 3):

TABLE 3

| Sample | Weight % HPA | Reaction Time (hrs) | IV (dl/g) |
|---|---|---|---|
| Control | 0 | 1 | 1.19 |
| 1 | 0.50 | 2.5 | 0.55 |
| 2 | 0.50 | 8.0 | 0.50 |

Again, the color of the resulting nylon-phenol solution was improved relative to the control, but the IV was decreased. It should be noted that the IV of the resin prepared in the presence of HPA did not increase further as a function of time.

EXAMPLE 4

Effect of Reaction Temperature-The Critical Variable

As noted previously, HPA is known to decompose at 130° C. into phosphoric acid and phosphine; thus, it was assumed that the typical 180° C. reaction temperature would be sufficient. Nevertheless, reactions were conducted using 0.5 wt% HPA at an oil temperature of 210° C. (pot temperature—195°-200° C.). Surprisingly, the color of the resulting nylon-phenol solution was "water white", an improvement over the color reduction experienced in the reactions conducted at 180° C. in Example 3, Samples 1 and 2. IV of the precipitated resin ranged from 0.7–0.9 dl/g. Furthermore, the IV's of built/devolatilized samples were typically 1.0–1.2 dl/g. It was therefore concluded that temperature plays a critical role in the mechanism by which hypophosphorous acid functions as a color reducing agent. Because of this finding, the other potential color-reducing candidates were studied as a function of temperature as well; however, the HPA was still the only effective color-reducing agent.

EXAMPLE 5

Other Studies with HPA

Several other reactions were performed to get an overall laboratory assessment of HPA as a color reducing agent. It was found that HPA prevented color formation if added prior to polymerization; interestingly, HPA could also be added to the final nylon-phenol solution, and the color is immediately reduced. In another case, HPA was added prior to polymerization, but at a reaction temperature of only 180° C.; color reduction was not optimum. After 1.5 hr at 180° C. the reaction temperature was increased to 200° C.; within a few minutes the color of the nylon-phenol solution was "water white". Finally, before scale-up to the 4 CV Helicone, the effects of HPA on 316 stainless steel had to be observed. Several pieces of polished ss tubing were placed in the reaction vessel; the objective was to note nylon-phenol solution color and whether pitting occurred on the ss tubing. The results indicated that no detrimental effects on polymer color, IV, or ss tubing occurred due to HPA addition.

EXAMPLE 6

Scale-up to the 4 CV Helicone

Several reactions were conducted in the 4 CV Helicone with varying amounts of HPA. In these cases, the resulting resins were devolatilized under vacuum, thereby removing the phenol byproduct as the reaction progressed. The results of the experiments are shown below (Table 4):

TABLE 4

| Reaction Number | HPA Level wt % | Color Reduction | IV, dl/g |
|---|---|---|---|
| 4CV-A45 | 0 | — | 0.97 |
| 4CV-A47 | 0.02 | No | 1.01 |
| 4CV-A48 | 0.05 | No | 1.04 |
| 4CV-A50 | 0.10 | Yes | 0.99 |
| 4CV-A52 | 0.25 | Yes | 1.22 |

As can be seen from the results, color reduction becomes visually evident at an HPA concentration of 0.10 wt %. However, it has been found that IV build becomes excessive at high HPA levels. Levels of from about 0.10 wt % to about 0.50 wt % of HPA based on the total weight of diamine and dicarboxylic acid is preferred because color formation is reduced without excessive molecular weight build-up. Preliminary mechanical property data indicate that the presence of HPA does not detrimentally affect the properties of nylon 6,I (relative to nylon 6,I with no HPA). The differences lie in the fact that the former has less color, higher IV, and a higher acid number than the latter.

What is claimed is:

1. A process for the preparation of a polyamide, said process comprising heating a mixture of a least one diaryl ester of a dicarboxylic acid having at least 6 carbon atoms and at least one diamine having at least 4 carbon atoms, at a temperature above the melting point of said polyamide until formation of said polyamide is substantially complete, said process including the step of adding an amount of hypophorous acid to said mixture in an amount selected from between from 0.1 weight percent and 0.5 weight percent based on the total weight of said mixture, said diamine being selected from the group consisting of 1,4-tetramethylene diamine, 1,6-hexamethylene diamine, 1,12-diaminodecane, bis(4-aminocyclohexyl)methane, meta xylylenediamine, 2-methyl pentamethylene diamine, and 1,3-cyclohexane bis(methylamine), and mixtures thereof.

2. A process according to claim 1, wherein said temperature is at least 180° C.

3. A process according to claim 1, wherein said temperature is at least 200° C.

4. A process according to claim 1, wherein the diester of dicarboxylic acid is selected from the group consisting of a diarylterephthalate, a diarylisophthalate and a mixture thereof.

5. A process according to claim 4, wherein the diaryl terephthalate is diphenylterephthalate.

6. A process according to claim 4, wherein the diaryl isophthalate is diphenyl isophthalate.

7. A process according to claim 1, wherein the diaryl ester is diphenyl adipate.

8. The process of claim 1 wherein the mixture comprises diphenyl adipate and 1,4-diaminobutane.

9. A process comprising the steps of:
   (a) preparing a polyamide by the method of claim 1; and simultaneously thereto
   (b) removing said reaction by-products from said mixture.

10. A process comprising the steps of:
    (a) preparing a polyamide by the method of claim 1; and subsequently thereto
    (b) recovering said polyamide from said reaction by-product.

11. A process for the preparation of a polyamide, said process comprising heating a mixture consisting of at least one diaryl ester of a dicarboxylic acid having at least 6 carbon atoms, at least one diamine having at least 4 carbon atoms, and hypophosphorous acid, said hypophosphorous acid being present at a level selected from between 0.1 and 0.25 weight percent of said mixture, at a temperature above the melting point of said polyamide until formation of said polyamide is substantially complete, said diamine being selected from the group consisting of 1,4-tetramethylene diamine, 1,6-hexamethylene diamine, 1,12-diaminodecane, bis(4-aminocyclohexyl)methane, meta xylylenediamine, 2-methyl pentamethylene diamine, and 1,3-cyclohexane bis(methylamine), and mixtures thereof.

12. A process according to claim 11, wherein said temperature is at least 180° C.

13. A process according to claim 11, wherein said temperature is at least 200° C.

14. A process for the preparation of a polyamide, said process comprising reacting a diaryl ester of a dicarboxylic acid and a diamine in the presence of hypophosphorous acid, said diamine being selected from the group consisting of 1,4-tetramethylene diamine, 1,6-hexamethylene diamine, 1,12-diaminodecane, bis(4-aminocyclohexyl)methane, meta xylylenediamine, 2- methyl pentamethylene diamine, and 1,3-cyclohexane bis(methylamine), and mixtures thereof.

15. The process of claim 14 wherein said diamine is 1,6-hexamethylenediamine.

16. The process of claim 15 wherein said diaryl ester is diphenyl isophthalate.

17. The process of claim 14 wherein said diaryl ester is diphenyl isophthalate.

* * * * *